US012691979B2

(12) United States Patent　　　　　(10) Patent No.:　US 12,691,979 B2

Ludwigsson　　　　　　　　　　　(45) Date of Patent:　Jul. 28, 2026

(54) HULL STRUCTURE FOR A SEMI-SUBMERSIBLE WIND POWER TURBINE PLATFORM

(71) Applicant: BASSOE TECHNOLOGY AB, Gothenburg (SE)

(72) Inventor: Robert Ludwigsson, Gothenburg (SE)

(73) Assignee: BASSOE TECHNOLOGY AB, Gothenburg (SE)

( * ) Notice: Subject to any disclaimer, the term of this patent is extended or adjusted under 35 U.S.C. 154(b) by 239 days.

(21) Appl. No.: 18/728,597

(22) PCT Filed: Jan. 11, 2023

(86) PCT No.: PCT/EP2023/050535

§ 371 (c)(1),
(2) Date: Jul. 12, 2024

(87) PCT Pub. No.: WO2023/135164

PCT Pub. Date: Jul. 20, 2023

(65) Prior Publication Data

US 2025/0084830 A1　　　Mar. 13, 2025

(30) Foreign Application Priority Data

Jan. 14, 2022　(SE) ..................................... 2250021-9
Jan. 14, 2022　(SE) ..................................... 2250022-7
(Continued)

(51) Int. Cl.
B63B 35/44　　　(2006.01)
B63B 1/10　　　(2006.01)
(Continued)

(52) U.S. Cl.
CPC .............. B63B 35/44 (2013.01); B63B 1/107 (2013.01); B63B 1/125 (2013.01); B63B 35/38 (2013.01);
(Continued)

(58) Field of Classification Search
CPC ......... B63B 35/44; B63B 1/107; B63B 1/125; B63B 35/38; B63B 79/00;
(Continued)

(56) References Cited

U.S. PATENT DOCUMENTS 9,810,204 B2　11/2017　Aubault et al.
10,518,846 B2　12/2019　Dagher et al.
(Continued)

FOREIGN PATENT DOCUMENTS

CN　　107539433 A　　1/2018
CN　　108715214 A　　10/2018
(Continued)

OTHER PUBLICATIONS

Search Report, Swedish Patent Application No. 2250022-7, dated Aug. 25, 2022.
(Continued)

*Primary Examiner* — Anthony D Wiest
(74) *Attorney, Agent, or Firm* — MARSHALL, GERSTEIN & BORUN LLP

(57)　　　　　ABSTRACT

A hull structure for a semi-submersible wind power turbine platform and a method for loading a set of such hull structures onto a semi-submersible cargo carrying marine vessel. The hull structure includes first, second and third buoyant stabilizing columns extending in a substantially vertical direction; and first and second elongated submersible buoyant pontoon structures extending in a substantially horizontal direction. The hull structure generally has a V-shape in the horizontal plane with the first and second (Continued)

pontoon structures forming legs in the V-shape and with the second column located where the legs meet. The hull structure is arranged so as to exhibit: i) a first angle in the horizontal plane between a central longitudinal axis of the first pontoon structure and a central longitudinal axis of the second pontoon structure; and ii) a second angle in the horizontal plane between a) a first imaginary line between a central point of the first stabilizing column and a central point of the second stabilizing column and b) a second imaginary line between the central point of the second stabilizing column and a central point of the third stabilizing column, wherein the second angle is larger than the first angle.

12 Claims, 8 Drawing Sheets

(30) Foreign Application Priority Data

| | | |
|---|---|---|
| Jan. 14, 2022 | (SE) | .................................... 2250023-5 |
| Jan. 14, 2022 | (SE) | .................................... 2250024-3 |
| Jun. 20, 2022 | (SE) | .................................... 2250755-2 |
| Aug. 26, 2022 | (CN) | ......................... 202211037940.9 |
| Sep. 30, 2022 | (SE) | .................................... 2251139-8 |

(51) Int. Cl.
| | |
|---|---|
| *B63B 1/12* | (2006.01) |
| *B63B 35/38* | (2006.01) |
| *B63B 79/00* | (2020.01) |
| *F03D 13/25* | (2016.01) |
| *B63B 39/06* | (2006.01) |

(52) U.S. Cl.
CPC ............ *B63B 79/00* (2020.01); *F03D 13/256* (2023.08); *B63B 2035/446* (2013.01); *B63B 2039/067* (2013.01); *B63B 2241/24* (2013.01); *F05B 2240/95* (2013.01); *F05B 2240/97* (2013.01)

(58) Field of Classification Search
CPC ........ B63B 2035/446; B63B 2039/067; B63B 2241/24; B63B 35/003; B63B 77/10; B63B 2001/044; B63B 2001/128; F03D 13/256; F05B 2240/95; F05B 2240/97; Y02E 10/727

See application file for complete search history.

(56) References Cited

U.S. PATENT DOCUMENTS

| | | | | |
|---|---|---|---|---|
| 12,157,545 | B2 * | 12/2024 | Loeken | ................... B63B 75/00 |
| 2015/0329180 | A1 | 11/2015 | Tominaga | |
| 2020/0339230 | A1 | 10/2020 | Hummel et al. | |

FOREIGN PATENT DOCUMENTS

| | | |
|---|---|---|
| CN | 113879474 A | 1/2022 |
| EP | 2789847 A1 | 10/2014 |
| EP | 2899111 A1 | 7/2015 |
| WO | WO-2007/009464 A1 | 1/2007 |
| WO | WO-2009/131826 A2 | 10/2009 |
| WO | WO-2013/084632 A1 | 6/2013 |
| WO | WO-2014/031074 A1 | 2/2014 |
| WO | WO-2016/138088 A1 | 9/2016 |
| WO | WO-2020/167137 A1 | 8/2020 |
| WO | WO-2021/219787 A1 | 11/2021 |
| WO | WO-2021/254990 A1 | 12/2021 |

OTHER PUBLICATIONS

Search Report, Swedish Patent Application No. 2250021-9, dated Sep. 23, 2022.
Search Report, Swedish Patent Application No. 2250024-3, mailed Sep. 14, 2022.
International Search Report and Written Opinion, International Patent Application No. PCT/EP2023/050535, mailed Feb. 8, 2023.
International Search Report and Written Opinion, International Patent Application No. PCT/EP2023/050537, mailed Feb. 9, 2023.
International Search Report and Written Opinion, International Patent Application No. PCT/EP2022/078156, mailed Feb. 8, 2023.
International Search Report and Written Opinion, International Patent Application No. PCT/EP2022/078157, mailed Feb. 8, 2023.

* cited by examiner

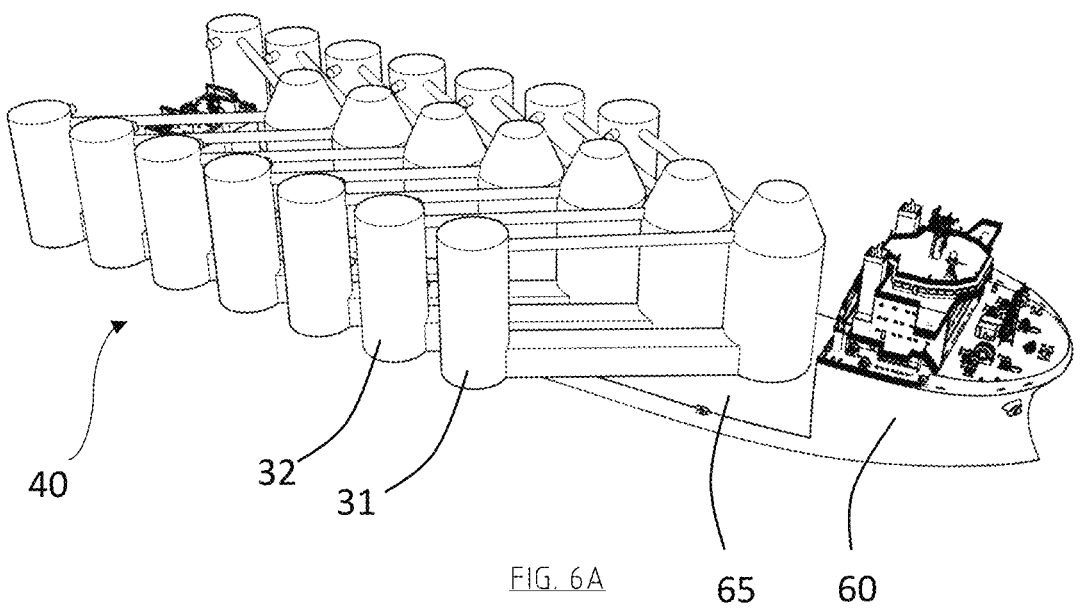
FIG. 6A
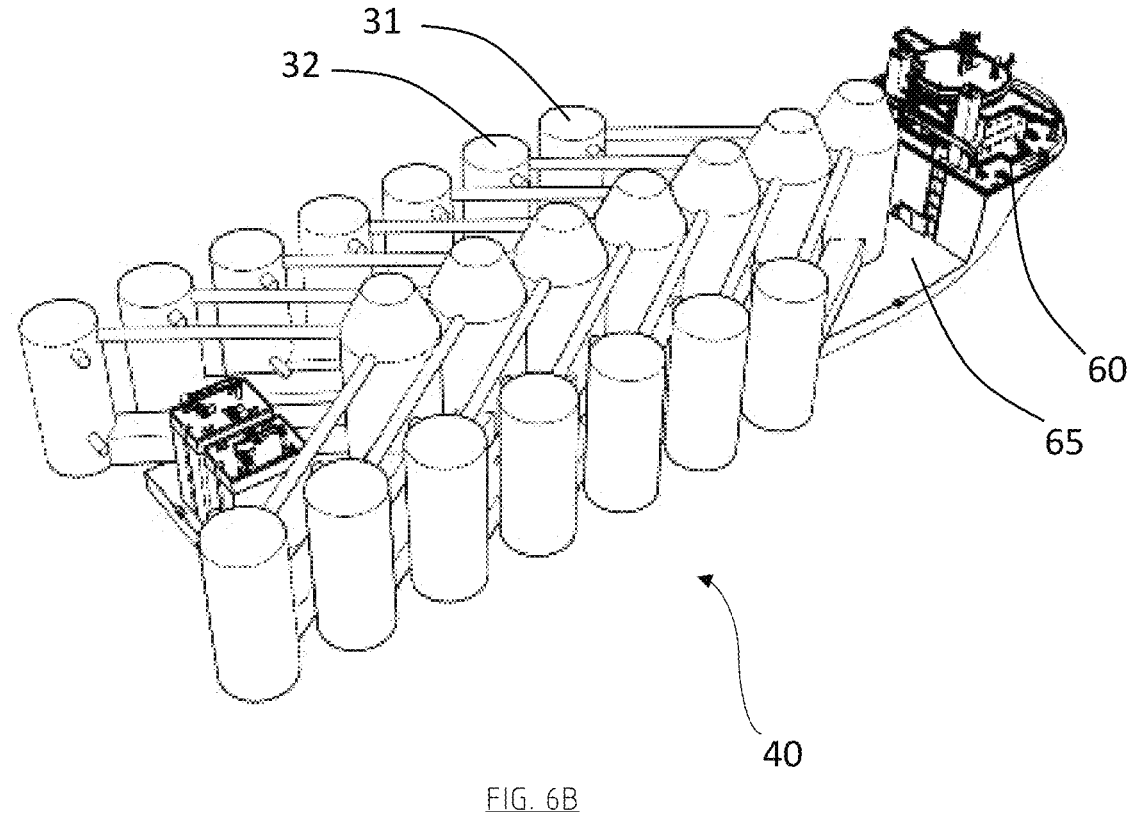
FIG. 6B
FIG. 6

60

60

60

103

102

100

20

HULL STRUCTURE FOR A SEMI-SUBMERSIBLE WIND POWER TURBINE PLATFORM

TECHNICAL FIELD

This invention relates to a hull structure for a semi-submersible wind power turbine platform. The invention also relates to a method for loading a set of hull structures of the above type onto a semi-submersible cargo carrying marine vessel, and to a marine vessel carrying a set of hull structures of the above type.

BACKGROUND OF THE INVENTION

There is a growing interest for offshore wind power, i.e., sea-based wind power stations/turbines that produce electricity. Such a wind turbine may have a fixed underwater foundation or, in particular at water depths larger than around 50-60 m, may be arranged on a floating platform anchored to the bottom.

A floating wind power turbine platform may be of a semi-submersible type comprising a semi-submersible hull structure onto which a wind turbine tower is arranged. The hull structure is typically made up of a plurality of stabilizing buoyant columns connected by submersible buoyant pontoons or other connection members. The turbine tower is typically arranged onto one of the columns. An example of a semi-submersible wind power turbine platform is disclosed in WO2021/219787.

Platforms of this type are large constructions. For instance, each column of a 10 MW wind power turbine platform may have a height of 30 m and the distance between the columns may be 60-80 m. The total weight of the hull structure may be more than 3000 tons. The turbine tower may extend up to, say, 150 m above sea level and each turbine blade may be more than 100 m long.

A challenge in the field of offshore wind power is manufacturing, transportation and installation of the semi-submersible platforms. Towing of a platform with the wind turbine tower and blades etc. installed is complicated and challenging, and to reduce the towing distance for such a complete platform it is preferably arranged so that the turbine tower and the turbine blades etc. are installed onto the hull structure in a sheltered location relatively close to the final offshore location. A particular transportation challenge arises if the hull structure is manufactured at a construction yard located far away from the sheltered location, for instance because there is no construction yard suitable for such large and heavy hull structures available at or near the sheltered location. In such a situation the hull structures need to be transported a relatively long distance.

A further challenge with regard to semi-submersible wind power turbine platforms is to design the hull structure so that the platform becomes robust and stable also under harsh offshore conditions and so that the platform withstands many years of operation under such conditions.

A still further challenge is of course that manufacturing, transportation, installation, operation, etc. of the platform or hull structure must be cost efficient for keeping and increasing the interest for offshore wind power.

SUMMARY OF THE INVENTION

An object of this invention is to provide a hull structure for a semi-submersible wind power turbine platform, where the hull structure exhibits improved properties with regard to stowing/loading onto a marine transportation vessel, which in turn provides for a more cost efficient transportation of hull structures. A further object is to provide a method for loading a set of such hull structures onto a semi-submersible cargo carrying marine vessel.

In one aspect the invention concerns a hull structure for a semi-submersible wind power turbine platform, wherein the hull structure comprises: first, second and third buoyant stabilizing columns extending in a substantially vertical direction; and first and second elongated submersible buoyant pontoon structures extending in a substantially horizontal direction; wherein the hull structure generally has a V-shape in the horizontal plane with the first and second pontoon structures forming legs in the V-shape and with the second column located where the legs meet; wherein the first pontoon structure extends between and connects the first and the second column, wherein the first pontoon structure is connected to a lower part of each of the first and second columns; wherein the second pontoon structure extends between and connects the second and the third column, wherein the second pontoon structure is connected to a lower part of each of the second and third columns; wherein the hull structure is arranged so as to exhibit: i) a first angle ($\alpha$) in the horizontal plane between a central longitudinal axis of the first pontoon structure and a central longitudinal axis of the second pontoon structure; and ii) a second angle ($\beta$) in the horizontal plane between a) a first imaginary line between a central point of the first stabilizing column and a central point of the second stabilizing column and b) a second imaginary line between the central point of the second stabilizing column and a central point of the third stabilizing column, wherein the second angle ($\beta$) is larger than the first angle ($\alpha$).

Thus, in short the hull structure of this disclosure is substantially V-shaped with two pontoon structures connecting three columns at a lower part thereof. A wind turbine tower may be arranged on one of the three columns, typically on the second column at the tip of the V, or alternatively on an additional column or support arranged onto the hull structure. The V-shape is relatively simple and provides for a good stability of the platform, in particular if further providing the hull structure with bracings that extend between and connect upper parts of the columns. The expression "the hull structure generally has a V-shape in the horizontal plane" refers to the first and second pontoon structures and their relative position; the hull structure may comprise further connection structures and pontoon structures.

A particular arrangement of the hull structure of this disclosure is that the first and second angles as defined above are different and further that the second angle is larger than the first angle. This means that the first and second pontoon structures do not extend along nor in parallel with the corresponding imaginary straight line between the central points of the second column and the first or third column, but that they instead extend in a direction that deviates from the direction given by the central points of the columns. That the second angle is larger than the first angle further means that the deviating direction of extension of the first and second pontoon structures is such that a straight pontoon structure may extend from an outer side part of the second column to a central or inner side part of the first or third column, where "outer" and "inner" refers to a central point of the hull structure in the horizontal plane, but not that the straight pontoon structure may extend from an inner side part of the second column to an outer side part of the first or third column. In a conventional V-shaped hull structure the first and second angles are equal and forms an angle of 60° if the center points of the three columns are located as the corners in an equilateral triangle. In contrast, in the hull structure of this disclosure the angle between the legs in the general V-shape, i.e., the angle between the pontoons, is smaller than 60° if the center points of the three columns are located as the corners in an equilateral triangle (which, however, is not necessarily the case).

This particular arrangement provides for the possibility to stow a set of V-shaped hull structures more efficiently onto a marine transportation vessel by partly "inserting" a first hull structure (i.e., the tip end of the V-shape where the second column is located) between the first and second pontoon structures of an adjacent second hull structure. As will be described more in detail below, by arranging the hull structure so that the second angle is larger than the first angle, it becomes possible to stow the hull structures more close to each other compared to conventional V-shaped hull structures of similar size. In turn, this provides for loading a higher number of platforms onto the same marine transportation vessel, e.g. for transport between the construction yard to the sheltered location where the wind turbine is to be installed. Because transportation of this type of large hull structures is very expensive, this in turn reduces the transportation costs significantly.

The central points mentioned above correspond to the centroids of the columns at a level associated with the lower parts thereof.

That the platform, and the hull structure, is semi-submersible means that the platform/hull structure can be partly located beneath the water surface when in operation. The entire pontoon structures and parts of the columns are typically to be located beneath the surface. Anchoring/securing of the platform/hull structure to the bottom can be arranged in different ways.

In an embodiment, the second angle (β) is in the interval 55-90°, preferably 60-80°, or even 60-72°. As given above, the second angle is the angle between the first and second imaginary lines extending through the central points of the first and third column, respectively, and intersecting at the central point of the second column. If all columns are identical, or at least if they have the same horizontal cross section (such as the same diameter), and if the distance between the first and second columns is the same as the distance between the second and third columns, the second angle should be 60° to provide the hull structure with the same water-plane moment of inertia about both an x-axis extending through the central point of the second column and a point in the middle between the first and third columns, as well as about an y-axis perpendicular to the x-axis at the centroid of the total water-plane area. With the same water-plane moment of inertia in both directions, the hull structure, and thus the wind power platform, will have good stability properties, with the same stiffness (metacentric height, which is a function of the moment of inertia) in all directions. Deviations from 60° may nevertheless be acceptable for such a hull structure if other advantages are obtained, such as improved stowing space-efficiency or simplified manufacturing or handling.

If the wind power tower is to be located onto the second column, it may be desired to design the second column with a larger diameter than that of the first and third column to increase the buoyancy and structural strength of the second column. This has an effect on the water-plane moment of inertia. To even out the water-plane moment of inertia about the x- and y-axes, the second angle can be increased up to e.g. around 70°. This also improves the stowing efficiency.

Also the length of the first and second pontoon structures may be adjusted to adjust the water-plane moment of inertia.

That the second column has a width or diameter that is larger than the width or diameter of each of the first and third columns means that the second column has a larger cross sectional area. With a larger cross sectional area at an intended operational waterline the second column will exhibit a larger waterplane area than each of the other columns when the hull structure/platform is set in operation.

In an embodiment, at least one of the first and the second pontoon structures has, at least along a major part of its length, a width that is less than a width of the lower part of the second stabilizing column. That is, the general width of one of the first and second pontoon structures is less than that of the second column at the part of the second column where the pontoon structures are connected. The second column may have a width that varies in the vertical direction, such as a cone. The width of the lower part of the second stabilizing column means the width in a direction perpendicular to a longitudinal axis of the respective connection structure. In a typical example, the width of each of the pontoon structures is around half of the width of the second column. Typically, the first and second pontoon structures have a width that also is less than that of the first and third columns.

In an embodiment, each of the first and second pontoon structures has an outer side facing away sideways from the hull structure and an inner side facing inwards towards the hull structure, wherein at least one of the first and second pontoon structures is arranged such that the outer side thereof is located closer to a corresponding outer side of the second stabilizing column than the inner side thereof is located in relation to a side of the second stabilizing column opposite the outer side of the second stabilizing column.

A pontoon structure arranged this way is thus not centrally arranged onto the second column but arranged closer to the outer side thereof. The outer side of the pontoon structure may be substantially aligned with the outer side of the second stabilizing column to increase the difference between the first and second angles. However, fixation of the pontoon structure to the column is typically simplified if there is some distance between the outer side of the pontoon and the column, i.e., if the outer sides of the pontoon and the column are not fully aligned. A further reason for not fully aligning the outer sides of the pontoon and the second column is that it may be that some distance is desired between the pontoons of adjacent hull structures stowed onto a transportation vessel.

In an embodiment, the second column has width or diameter that is larger than the width or diameter of each of the first and third columns. As mentioned above, this enables the second column to exhibit a higher buoyancy, which is useful for carrying the wind turbine tower. A larger diameter/width of the second column also makes it possible to decrease the first angle (the angle between the pontoons) since the end of the pontoon connected to the second column can be placed further away from the central point of the second column and thus further away from a center line of the hull structure. In turn, this can be used to improve stowing space-efficiency. As mentioned above, when the diameter or width of the second column is larger than that of the other columns, measures may be taken to adjust the waterline inertia moment.

In an embodiment, each of the first and second pontoon structures has a lower side facing downwards and wherein the lower sides of the first and second pontoon structures are substantially aligned with each other in the horizontal plane.

In an embodiment, the lower sides of the first and second pontoon structures are substantially aligned with downwardly facing lower sides of each of the first, second and third buoyant stabilizing columns. The underside of the entire hull structure will then be substantially flat.

In an embodiment, the first and second pontoon structures have a substantially equal length.

The invention also relates to a method for loading a set of hull structures onto a semi-submersible cargo carrying marine vessel configured to be lowered partly below the water surface into a lower position and be raised to an upper position so as to load onto the vessel cargo that is located at the water surface above the vessel, wherein the set of hull structures comprises a plurality of hull structures of the above type. The method comprises: providing the set of hull structures floating in water; arranging the set of hull structures in a row above the marine vessel when the marine vessel is in its lower position; and raising the marine vessel to its upper position so as to load the row of hull structures onto the marine vessel.

In an embodiment, arranging the set of hull structures in the row comprises: arranging the first and second hull structures adjacent each other and so that the second hull structure is located with the second column of the second hull structure positioned between the first and second pontoon structures of the first hull structure, wherein the second column of the second hull structure is positioned closer to the second column of the first hull structure than to the first and third columns of the first hull structure.

The invention also concerns a marine vessel carrying a set of hull structures, wherein the set of hull structures comprises at least a first and a second hull structure of the above type.

In an embodiment, the set of hull structures are arranged in a row with the first and second hull structures located adjacent each other, wherein the second hull structure is located with the second column of the second hull structure positioned between the first and second pontoon structures of the first hull structure, wherein the second column of the second hull structure is positioned closer to the second column of the first hull structure than to the first and third columns of the first hull structure.

BRIEF DESCRIPTION OF DRAWINGS

In the description of the invention given below reference is made to the following figure, in which:

FIG. 6 shows first and second perspective views (FIGS. 7A and 7B) of a set of hull structures similar to FIG. 4 stowed in a row onto a deck of a marine transportation vessel.

DESCRIPTION OF EXAMPLE EMBODIMENTS OF THE INVENTION

Figure 1:
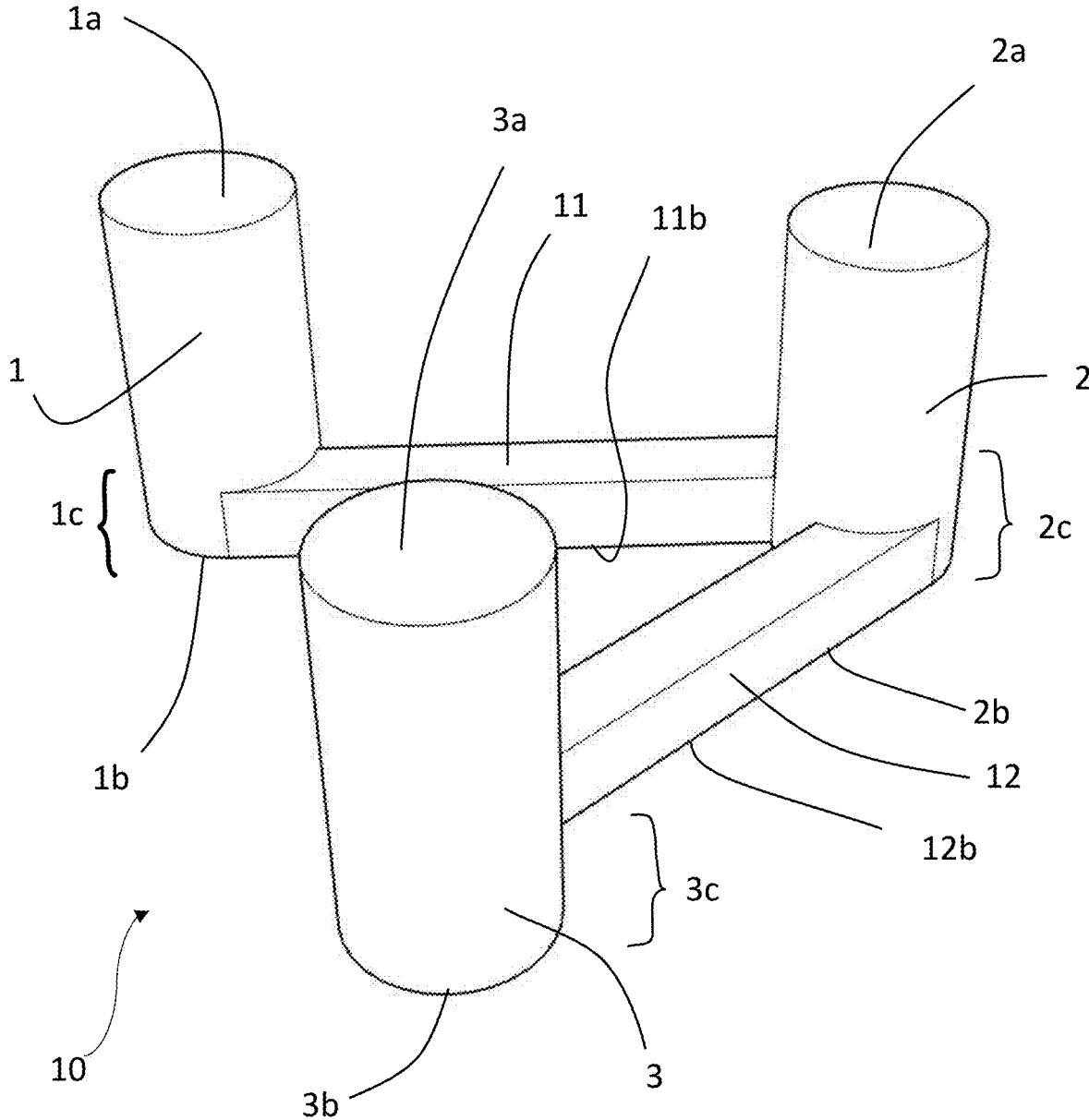
FIG. 1 shows a perspective view of a first embodiment of a hull structure according to this disclosure.
Figure 2:
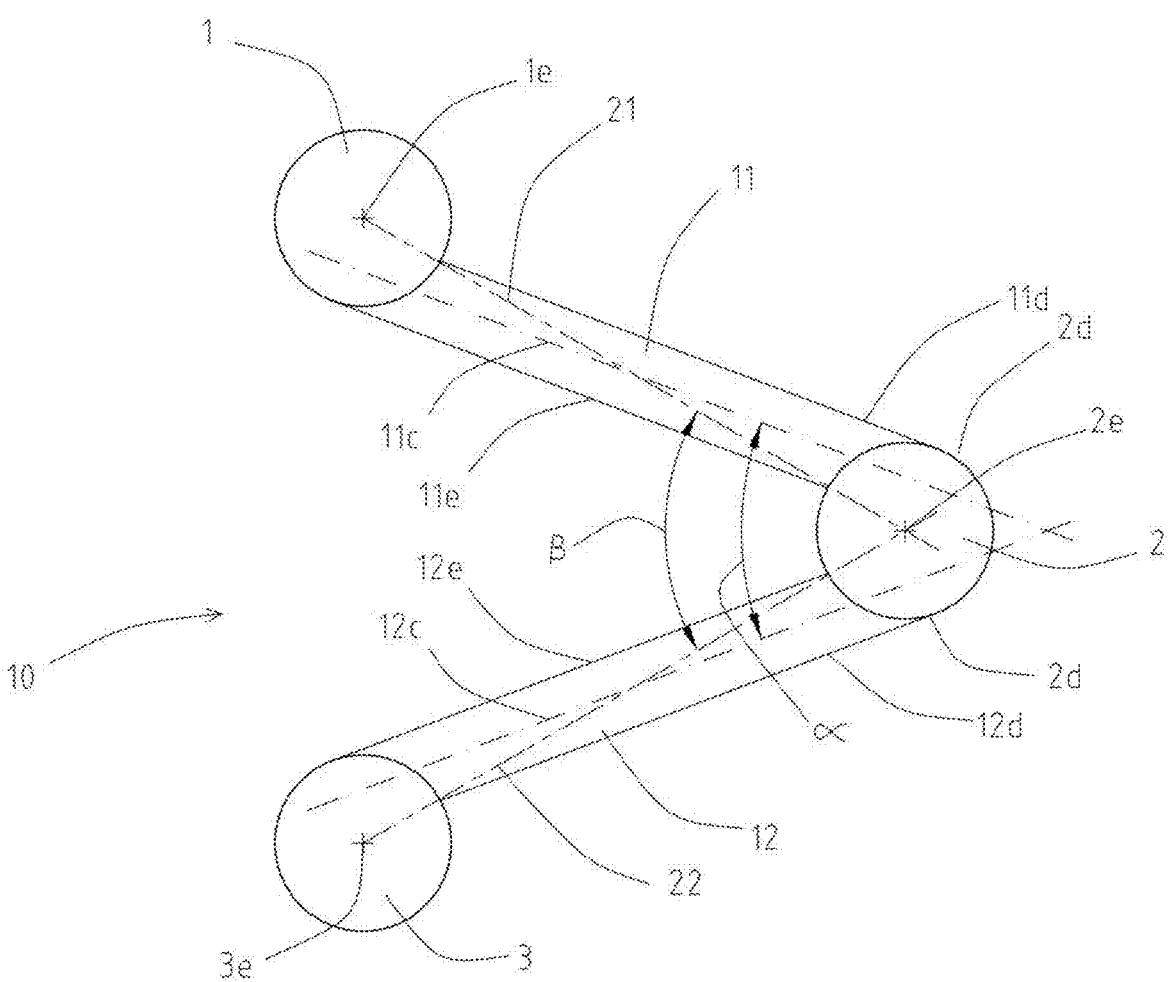
FIG. 2 shows a top view of the hull structure of FIG. 1.
Figure 8:
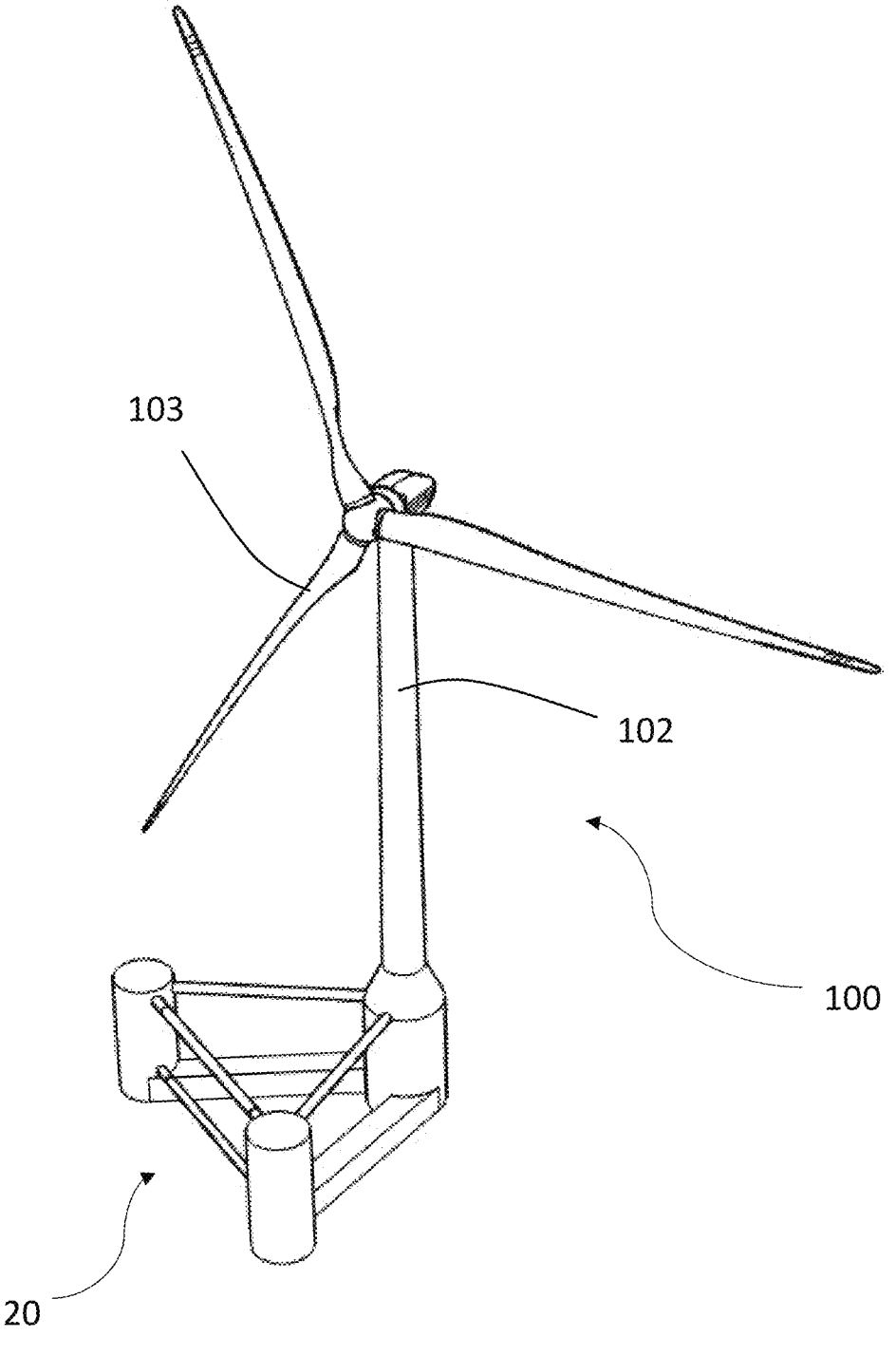
FIG. 8 shows a semi-submersible wind power turbine platform comprising a hull structure according to this disclosure.

FIGS. 1 and 2 show a first embodiment of a hull structure 10 for a semi-submersible wind power turbine platform 100 (see FIG. 8). The hull structure 10 comprises first, second and third buoyant stabilizing columns 1, 2, 3 extending in a substantially vertical direction and first and second elongated submersible buoyant pontoon structures 11, 12 extending in a substantially horizontal direction. The hull structure 10 generally has a V-shape in the horizontal plane with the first and second pontoon structures 11, 12 forming legs in the V-shape and with the second column 2 located where the legs meet.

The first pontoon structure 11 extends between and connects the first and the second column 1, 2, and it is connected to a lower part 1c, 2c of each of the first and second columns 1, 2. The second pontoon structure 12 extends between and connects the second and the third column 2, 3, and it is connected to a lower part 2c, 3c of each of the second and third columns 2, 3.

Each of the first and the second pontoon structures 11, 12 has a width that is less than a width of the lower part 2c of the second stabilizing column 2, in this example the width is around half of that of the second column 2 (as well around half of that of the first and third column 1, 3).

Further, each of the first and second pontoon structures 11, 12 has a lower side 11b, 12b facing downwards, which sides are substantially aligned with each other in the horizontal plane and also substantially aligned with downwardly facing lower sides 1b, 2b, 3b of each of the first, second and third buoyant stabilizing columns 1, 2, 3. The first and second pontoon structures 11, 12 have a substantially equal length.

As shown in FIG. 2, the hull structure 10 is arranged so as to exhibit: i) a first angle $\alpha$ in the horizontal plane between a central longitudinal axis 11c of the first pontoon structure 11 and a central longitudinal axis 12c of the second pontoon structure 12 (i.e., an angle between center-line axes of the two pontoon structures); and ii) a second angle $\beta$ in the horizontal plane between a) a first imaginary line 21 between a central point 1e of the first stabilizing column 1 and a central point 2e of the second stabilizing column 2 and b) a second imaginary line 22 between the central point 2e of the second stabilizing column 2 and a central point 3e of the third stabilizing column 3. The second angle $\beta$ is larger than the first angle $\alpha$.

As further shown in FIG. 2, each of the first and second pontoon structures 11, 12 has an outer side 11d, 12d facing away sideways from the hull structure and an inner side 11e, 12e facing inwards towards the hull structure 10, wherein each of the first and second pontoon structures 11, 12 is arranged such that the outer side 11d, 12d thereof is located closer to a corresponding outer side 2d of the second stabilizing column 2 than the inner side 11e, 12e thereof is located in relation to a side of the second stabilizing column 2 opposite the outer side 2d of the second stabilizing column 2. The pontoon outer sides 11d, 12d are in this example even aligned with the outer side 2d of the second column 2.

Figures 7, 7A, 7B, 7C:
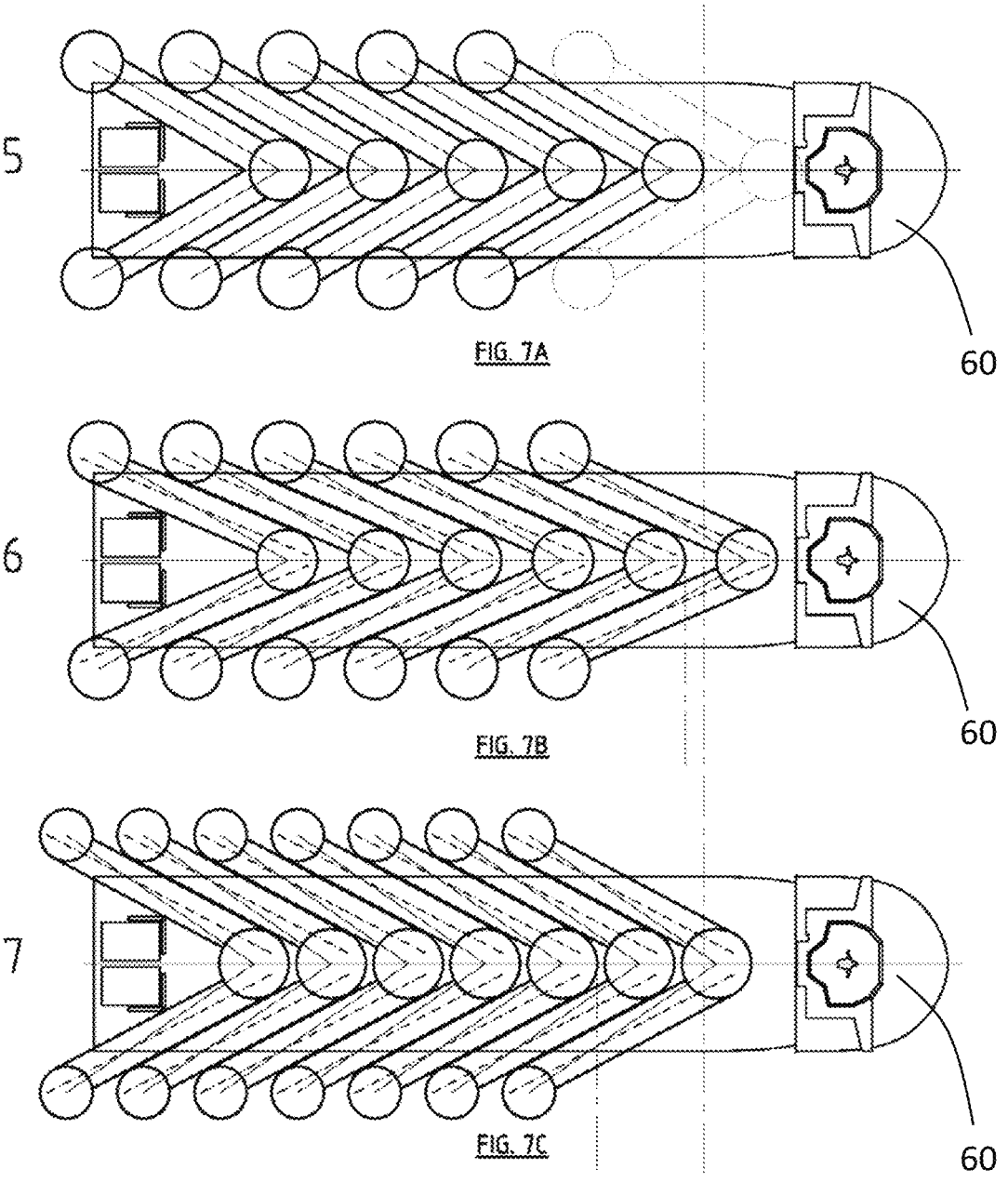
FIG. 7 shows a comparison (FIGS. 7A-7C) of stowing efficiency between sets of hull structures with different hull structure design.

The pontoon structures 11, 12 are thus not centrally arranged onto the second column 2 but arranged closer to the corresponding outer side 2d thereof. The opposite end of each pontoon structure 11, 12 is instead located closer to, and is in this example even aligned with, an inner side of first and third column 1, 3, respectively. This "twist" of the pontoon structures 11, 12 (in relation to the imaginary lines 21, 22) decreases the first angle $\alpha$. As shown in FIG. 7, this "twist" makes it possible to stow the hull structures closer to each other, it thus increases the stowing space-efficiency, so that a higher number of hull structures can be loaded onto a marine transportation vessel.

In the example shown in FIGS. 1 and 2, the columns 1, 2, 3 are arranged in relation to each other as the corners of an equilateral triangle, which means that the second angle β in this case is 60°.

The hull structure embodiments shown in FIGS. 2-8 are structured in a principally similar way as the hull structure 10 shown in FIG. 1, and therefore the same reference numbers have been used in all figures for similar components.

Figure 3:
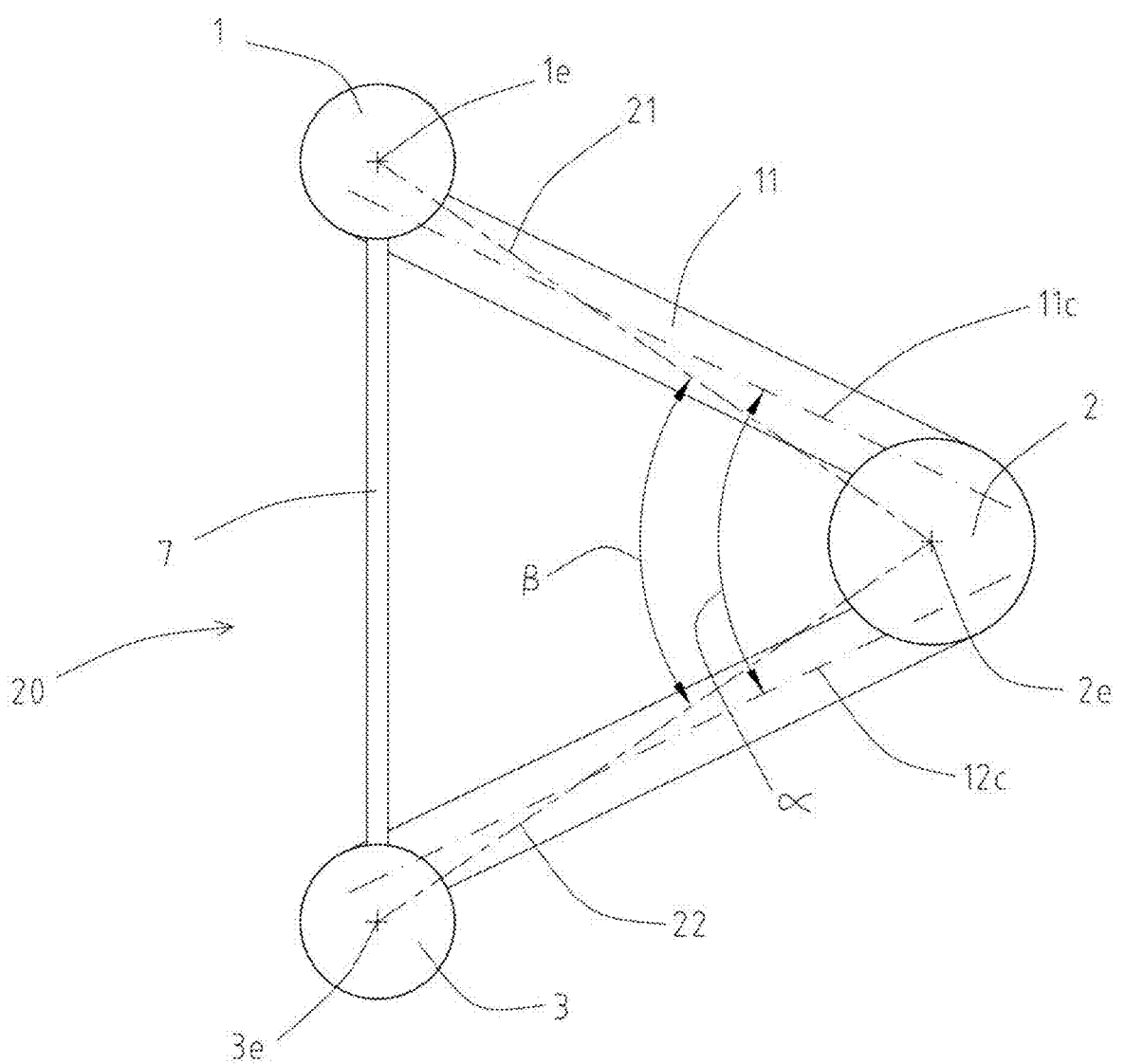
FIG. 3 shows a top view of a second embodiment of a hull structure according to this disclosure.

FIG. 3 shows a second embodiment of a hull structure 20 where the second column 2 has a diameter that is larger than the diameter of each of the first and third columns 1, 3. The second column 2 thus obtains a higher buoyancy, which is useful for supporting a wind turbine tower arranged onto the second column (as illustrated in FIG. 8).

The larger diameter of the second column 2 allows the pontoon structures 11, 12 to be located even further from the central point 2e of the second column 2, which can be used to decreases the first angle α.

To adjust the waterplane moment of inertia to the fact that the second column 2 has a larger diameter, the distance between first and second columns 1, 3 has been increased compared to the hull structure 10 of FIG. 1. This means that also the second angle β has been increased, from 60° in FIG. 1 to around 70° for the hull structure 20 of FIG. 3.

A larger second angle β is not only useful for balancing the waterline inertia moment of the hull structure 20, it also further improves the stowing properties (see FIG. 7).

The hull structure 20 is further provided with a brace 7 extending between the first and third column 1, 3 so as to strengthen the hull structure. Braces 7 may be arranged between some or all columns and in particular between the first and third column 1, 3 there may be arranged both a lower and a higher brace (as exemplified in FIG. 5). Braces between the first and third columns 1, 3 prevent efficient stowing so such braces are not mounted when loading the hull structures onto the marine vessel but are instead mounted after the transportation. End sections of the braces 7 may, however, be mounted when assembling and transporting the hull structure (as indicated in FIG. 6) and a brace midsection can be mounted after transport. Bracing end sections and midsections are indicated in FIG. 5.

Figure 4:
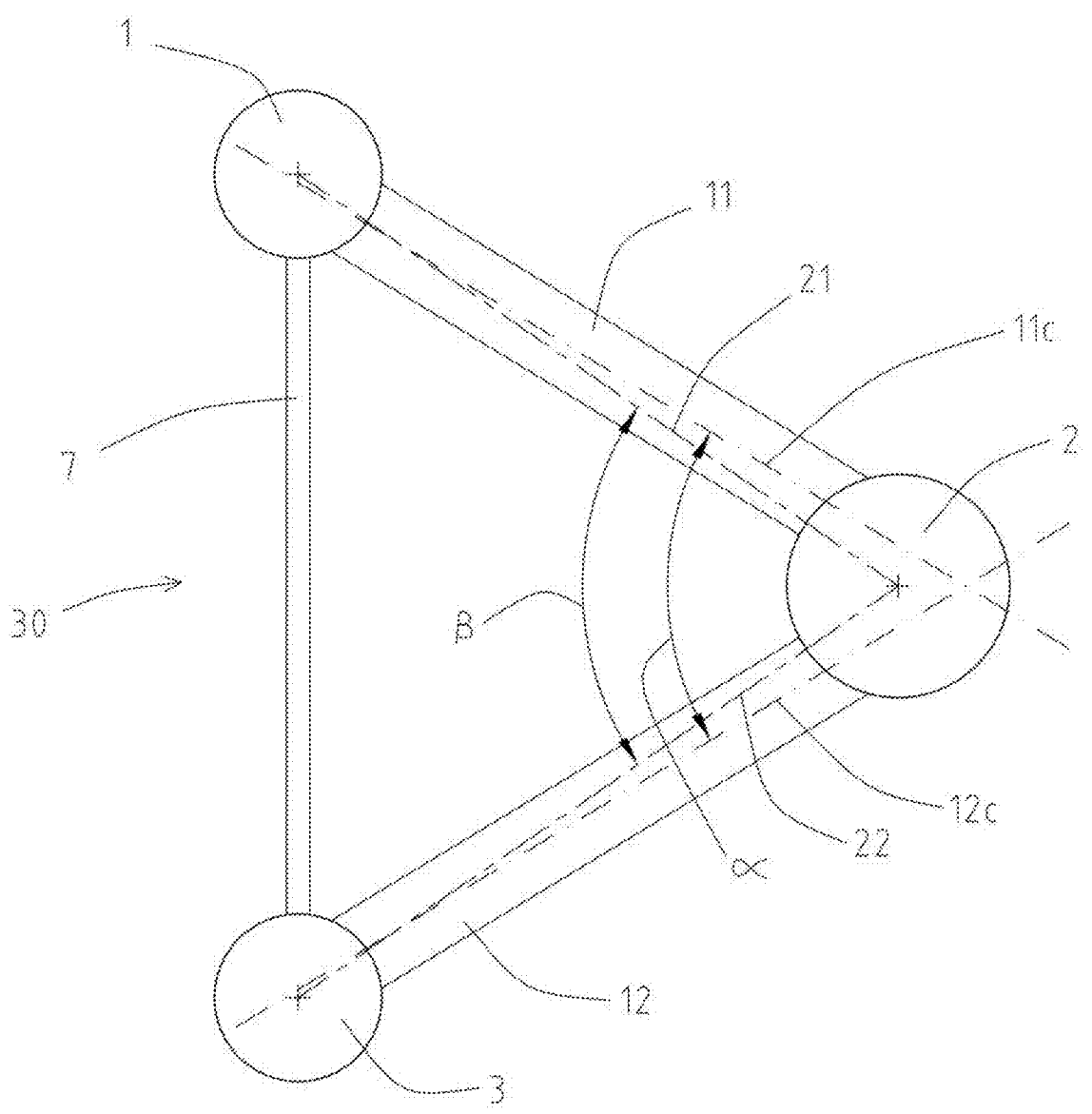
FIG. 4 shows a top view of a third embodiment of a hull structure according to this disclosure.

FIG. 4 shows a third embodiment of a hull structure 30 similar to the embodiment shown in FIG. 3. The difference is that the pontoon structures 11, 12 are less "twisted" so that the first angle α is larger in FIG. 4 than in FIG. 3 (and the difference between the first and second angles is smaller in FIG. 4 than in FIG. 3).

In contrast to FIG. 3, the outer and inner sides of the pontoon structures of FIG. 4 are not aligned with the sides of the corresponding columns. Typically, this makes it easier to arrange the connection between the pontoons and the columns, it thus simplifies manufacturing.

Figure 5:
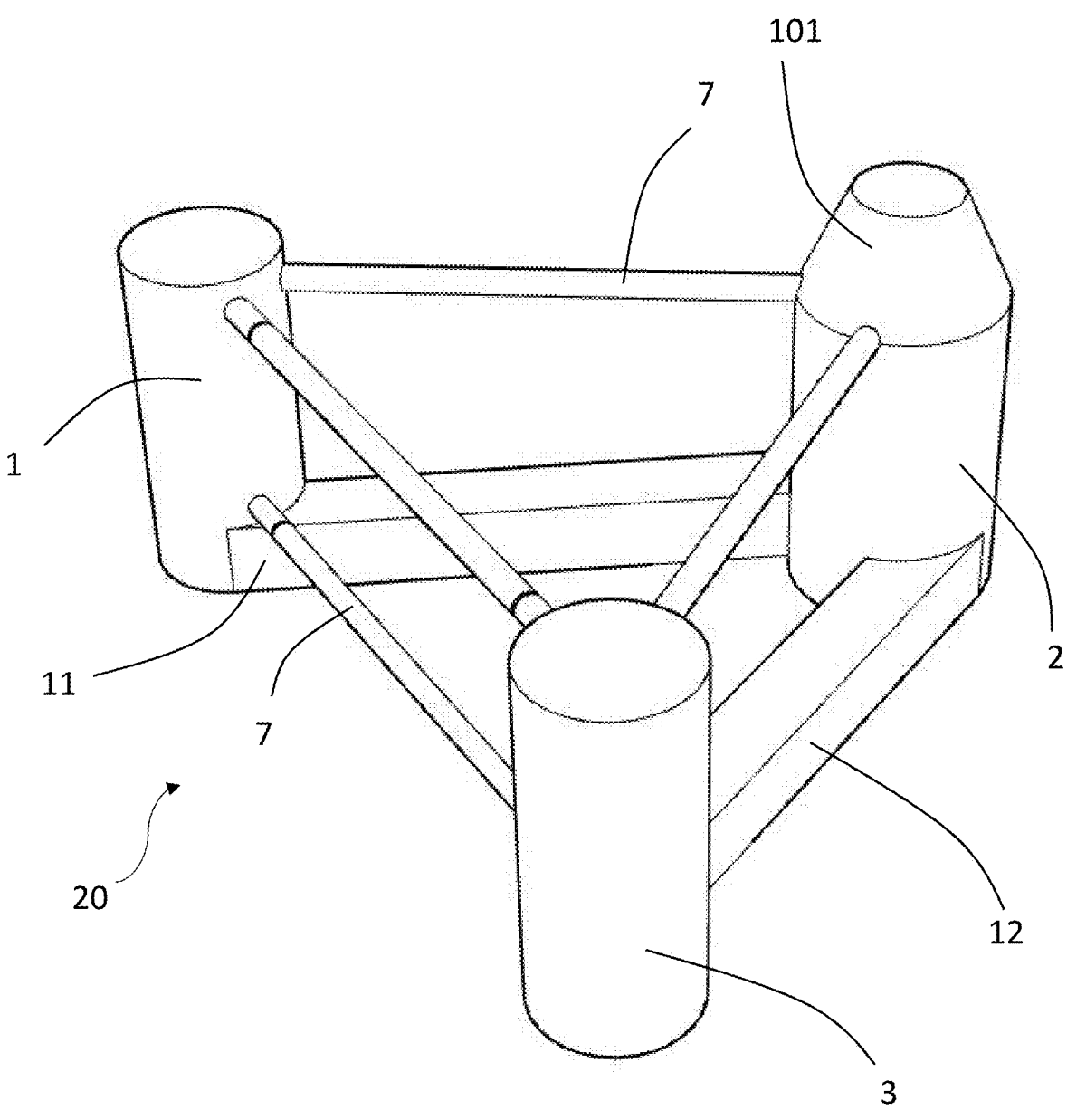
FIG. 5 shows a perspective view of the hull structure of FIG. 3 with some additional components added.

FIG. 5 shows the hull structure 20 of FIG. 3 further provided with bracings 7 (see above) and a support 101 for the wind turbine tower.

FIG. 6 shows first and second perspective views (FIGS. 6A and 6B) of a set of hull structures 40 stowed in a row onto a deck 65 of a marine transportation vessel 60 in the form of a semi-submersible cargo carrying marine vessel configured to be lowered partly below the water surface into a lower position and be raised to an upper position so as to load onto the vessel cargo that is located at the water surface above the vessel.

The row of hull structures 40 in FIGS. 6A and 6B includes a first hull structure 31, a second hull structure 32, and five additional hull structures, all seven of the type shown in FIG. 4 (but with a mid-portion of the brace 7 between the first and third columns 1, 3 removed and with a wind turbine tower support 101 mounted).

A method for loading the set of hull structures 40 onto the semi-submersible cargo carrying marine vessel 60 comprises:

providing the set of hull structures 40 floating in water;

arranging the set of hull structures 40 in a row above the marine vessel 60 when the marine vessel is in its lower position; and raising the marine vessel 60 to its upper position so as to load the row of hull structures 40 onto the deck 65 of the marine vessel.

Arranging the set of hull structures 40 in the row may comprise: arranging the first and a second hull structure 31, 32 adjacent each other so that the second hull structure 32 is located with the second column 2 of the second hull structure 32 positioned between the first and second pontoon structures 11, 12 of the first hull structure 31, wherein the second column 2 of the second hull structure 32 is positioned closer to the second column 2 of the first hull structure 31 than to the first and third columns 1, 3 of the first hull structure 31. This is also how the set of hull structures 40 are arranged onto the vessel 60 during transport. The hull structures may be fixed to each other already when arranged in the floating row, and they are typically fixed to each other and to the deck 65 of the vessel 60 during transport.

FIG. 7 shows a comparison (FIGS. 7A-7C) of stowing efficiency between sets of hull structures with different hull structure design.

FIG. 7A shows hull structures of a conventional design where the first angle α equals the second angle β and where both angels are 60°. FIGS. 7B and 7C show hull structure designs according to the present disclosure where β>α. In FIG. 7B the hull structure design is similar to that of FIGS. 1 and 2. In FIG. 7C the hull structure design is similar to that of FIG. 3. In both FIGS. 7B and 7C the sides of the pontoons align with sides of the columns (as described more in detail above). The hull structures of FIG. 7C differ from those of FIG. 7B in that the second column 2 has a larger diameter and in that the second angle β is larger (around 70° in FIG. 7C compared 60° in FIG. 7B) to adjust the waterplane moment of inertia (as also described more in detail above).

As shown in FIGS. 7A-7C, the number of hull structures that can be stowed on a given length of the deck of the vessel 60 is 5 for the design of FIG. 7A, 6 for the design of FIG. 7B, and 7 for design of FIG. 7C. It is thus clear that arranging the hull structure so that β>α improves the stowage efficiency of this type of V-shaped hull structures. This is of course only an example; the number of hull structures that in practice can be stowed onto a vessel of this type depends on the size of the hull structures and the size of the vessel, but FIG. 7A-7C show the principle of improved stowage efficiency.

A thin dashed line in FIG. 7A indicates a sixth hull structure to show the corresponding length of a further hull structure (that does not fit onto the vessel 60).

FIG. 8 shows a semi-submersible wind power turbine platform 100 comprising a hull structure 20 according to FIG. 3. The platform 100 is provided with a wind turbine tower 102 in turn provided with three blades 103 (as well as a generator etc., which is not shown in the figures).

The invention is not limited by the embodiments described above but can be modified in various ways within the scope of the claims. For instance, the columns 1, 2, 3 do not necessarily have to have a circular horizontal cross section but may e.g. have a polygonal cross section. Similarly, the first and second elongated submersible pontoon structures 11, 12 do not necessarily have to have a polygonal vertical cross section but may e.g. have rounded corners or a circular cross section. A further brace member or pontoon structure may extend between the lower parts of the first and third column, and/or between the first and second pontoon structures, at about the same level as the first and second pontoon structures. Such a further brace member or pontoon structure may interfere during stowing of hull structures and is therefore preferably arranged so that its upper side is located at a lower level than the upper side of the first and second pontoon structures. The vertical thickness of such a further brace member or pontoon structure may be less than that of the first and second pontoon structures. When the hull structure is provided with such a further brace member or (third) pontoon structure, the term "V-shape in the horizontal plane" refers to the first and second pontoon structures. The further brace member or (third) pontoon structure may form a connection of the two legs in the V-shape so as to form a Δ- or A-shape. Moreover, the hull structure may be provided with a controllable ballast system configured to allow control of an inclination of the hull structure when floating in water.

One or more of the bracings/brace members may be a stiff structure typically capable of carrying a load in both longitudinal directions, i.e., it can withstand both tensile and compression forces directed along its longitudinal axis. Alternatively, one or more of the brace members may be a wire, rope or other non-stiff structure, which may be pretensioned when installed, typically capable of carrying a load mainly, but not exclusively, when subject to longitudinally directed tensile forces. As shown in FIGS. 6-7, the first and third columns are located outside of the deck of the vessel. This means that the first and third columns, or at least the upper parts thereof, tend to be forced somewhat apart, i.e., the columns tend to bend or flex outwards at the top, during transport, which in turn means that the a brace member connecting the upper parts of the first and second columns mainly will be subject to tensile forces during transport. Such forces or loads can be well carried by either a stiff or a non-stiff brace member.

A stiff brace member may be made of a metallic material, such as steel, and may form a pipe or beam. A non-stiff brace member may be in the form of a wire or a rope and may be pre-tensioned so as to reduce the forces acting onto different parts of the hull structure during transport.

The invention claimed is:

1. A hull structure for a semi-submersible wind power turbine platform, comprising:

first, second and third buoyant stabilizing columns extending in a substantially vertical direction; and first and second elongated submersible buoyant pontoon structures extending in a substantially horizontal direction;

wherein the hull structure generally has a V-shape in the horizontal plane with the first and second pontoon structures forming legs in the V-shape and with the second column located where the legs meet;

wherein the first pontoon structure extends between and connects the first and the second column, wherein the first pontoon structure is connected to a lower part of each of the first and second columns;

wherein the second pontoon structure extends between and connects the second and the third column, wherein the second pontoon structure is connected to a lower part of each of the second and third columns;

wherein the hull structure is arranged so as to exhibit:

i) a first angle in the horizontal plane between a central longitudinal axis of the first pontoon structure and a central longitudinal axis of the second pontoon structure; and ii) a second angle in the horizontal plane between a) a first imaginary line between a central point of the first stabilizing column and a central point of the second stabilizing column and b) a second imaginary line between the central point of the second stabilizing column and a central point of the third stabilizing column, wherein the second angle is larger than the first angle.

2. The hull structure according to claim 1, wherein the second angle is in the interval 55-90°, preferably 60-80°.

3. The hull structure according to claim 1, wherein each of the first and the second pontoon structures has, at least along a major part of its length, a width that is less than a width of the lower part of the second stabilizing column.

4. The hull structure according to claim 1, wherein each of the first and second pontoon structures has an outer side facing away sideways from the hull structure and an inner side facing inwards towards the hull structure, wherein at least one of the first and second pontoon structures is arranged such that the outer side thereof is located closer to a corresponding outer side of the second stabilizing column than the inner side thereof is located in relation to a side of the second stabilizing column opposite the outer side of the second stabilizing column.

5. The hull structure according to claim 1, wherein the second column has a width or diameter that is larger than the width or diameter of each of the first and third columns.

6. The hull structure according to claim 1, wherein each of the first and second pontoon structures has a lower side facing downwards and wherein the lower sides of the first and second pontoon structures are substantially aligned with each other in the horizontal plane.

7. The hull structure according to claim 6, wherein the lower sides of the first and second pontoon structures are substantially aligned with downwardly facing lower sides of each of the first, second and third buoyant stabilizing columns.

8. The hull structure according to claim 1, wherein the first and second pontoon structures have a substantially equal length.

9. A method for loading a set of hull structures onto a semi-submersible cargo carrying marine vessel configured to be lowered partly below the water surface into a lower position and be raised to an upper position so as to load onto the vessel cargo that is located at the water surface above the vessel, wherein the set of hull structures comprises a plurality of hull structures arranged according to claim 1, the method comprising:

providing the set of hull structures floating in water;

arranging the set of hull structures in a row above the marine vessel when the marine vessel is in its lower position; and raising the marine vessel to its upper position so as to load the row of hull structures onto the marine vessel.

10. The method according to claim 9, wherein arranging the set of hull structures in the row comprises:

arranging a first and a second hull structure adjacent each other and so that the second hull structure is located with the second column of the second hull structure positioned between the first and second pontoon structures of the first hull structure, wherein the second column of the second hull structure is positioned closer to the second column of the first hull structure than to the first and third columns of the first hull structure.

11. A marine vessel carrying a set of hull structures, wherein the set of hull structures comprises at least a first and a second hull structure arranged according to claim 1.

12. The marine vessel according to claim 11, wherein the set of hull structures are arranged in a row with the first and second hull structures located adjacent each other, wherein the second hull structure is located with the second column of the second hull structure positioned between the first and second pontoon structures of the first hull structure, and wherein the second column of the second hull structure is positioned closer to the second column of the first hull structure than to the first and third columns of the first hull structure.

* * * * *